United States Patent [19]

Flanagan et al.

[11] Patent Number: 5,141,636

[45] Date of Patent: Aug. 25, 1992

[54] PURIFICATION SYSTEM

[75] Inventors: David T. Flanagan; Randall E. Gibbons, both of League City, Tex.

[73] Assignee: United States of America as represented by the Administrator, National Aeronautics and Space Administration, Washington, D.C.

[21] Appl. No.: 638,600

[22] Filed: Jan. 8, 1991

[51] Int. Cl.$^5$ .................. C02F 1/32; B01D 24/46
[52] U.S. Cl. .................. 210/209; 210/266; 210/269; 210/287; 210/670; 210/748; 210/758; 210/256
[58] Field of Search ............... 210/748, 763, 764, 758, 210/256, 335, 202, 209, 266, 287, 269, 336, 337, 338, 670; 422/24, 186, 186.3, 187, 211

[56] References Cited

U.S. PATENT DOCUMENTS

| 3,846,296 | 11/1974 | Hay | 210/670 |
| 4,219,415 | 8/1980 | Nassef et al. | 210/748 |
| 4,260,484 | 4/1981 | Connolly | 210/748 |
| 4,661,264 | 4/1987 | Goudy, Jr. | 210/748 |
| 4,735,728 | 4/1988 | Wemhoff | 210/668 |
| 4,769,131 | 9/1988 | Noll et al. | 210/748 |
| 4,788,038 | 11/1988 | Matsunaga | 210/764 |
| 4,798,702 | 1/1989 | Tucker | 422/24 |
| 4,857,204 | 8/1989 | Joklik | 210/748 |
| 4,861,484 | 8/1989 | Lichtin et al. | 210/638 |
| 4,892,712 | 1/1990 | Robertson et al. | 210/763 |
| 4,899,057 | 2/1990 | Koji | 210/748 |
| 4,971,687 | 11/1990 | Anderson | 210/232 |
| 4,983,307 | 1/1991 | Nesathurai | 210/748 |
| 5,068,030 | 11/1991 | Chen | 210/266 |
| 5,069,885 | 12/1991 | Ritchie | 210/763 |

FOREIGN PATENT DOCUMENTS

PH7074 7/1987 Australia ................ 210/763

Primary Examiner—Ivars Cintins
Assistant Examiner—Cynthia L. Nessler
Attorney, Agent, or Firm—Russell E. Schlorff; Guy M. Miller; Edward K. Fein

[57] ABSTRACT

A system for prolonging the life of a GAC water treatment device in which an ultraviolet light transparent material is used to constrain water to flow over carbon surfaces configured to receive maximum flux from a U/V radiation source, for the purpose of preventing microbial proliferation on the carbon surfaces, oxidizing organic contaminants adsorbed from the water onto the carbon surfaces and from biodegradation of adsorbed microbial forms, disinfecting water, and oxidizing organic contaminants in the water.

8 Claims, 2 Drawing Sheets

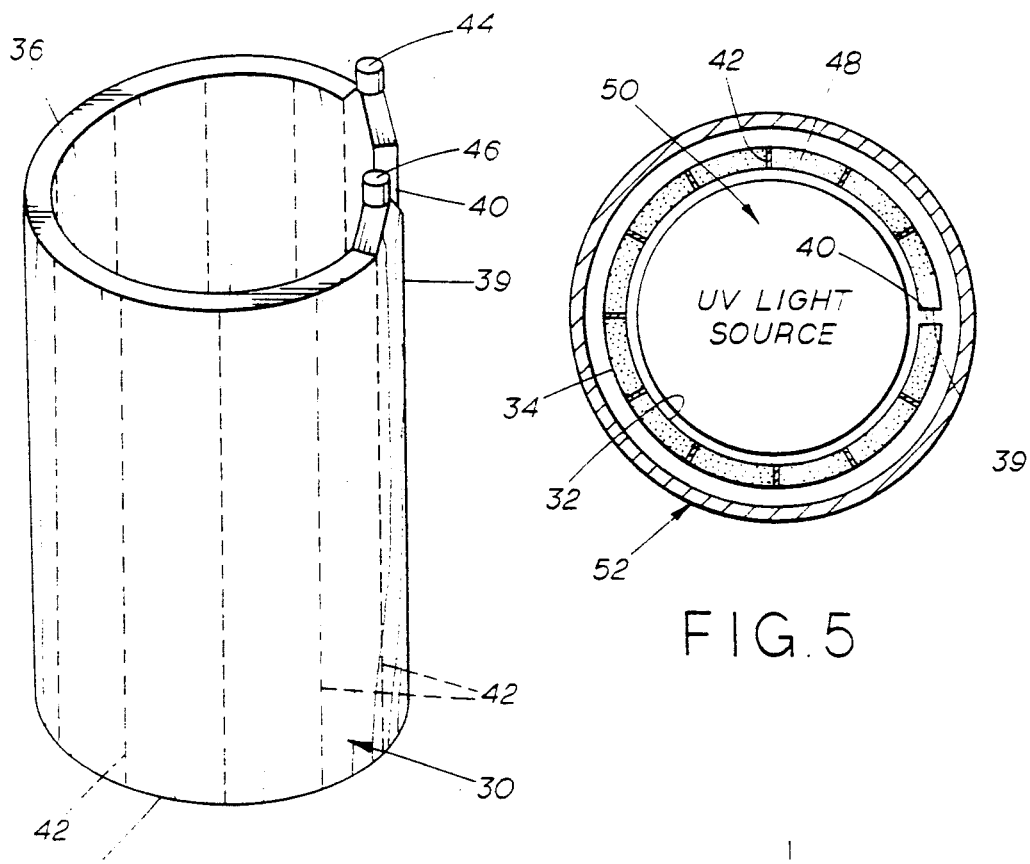
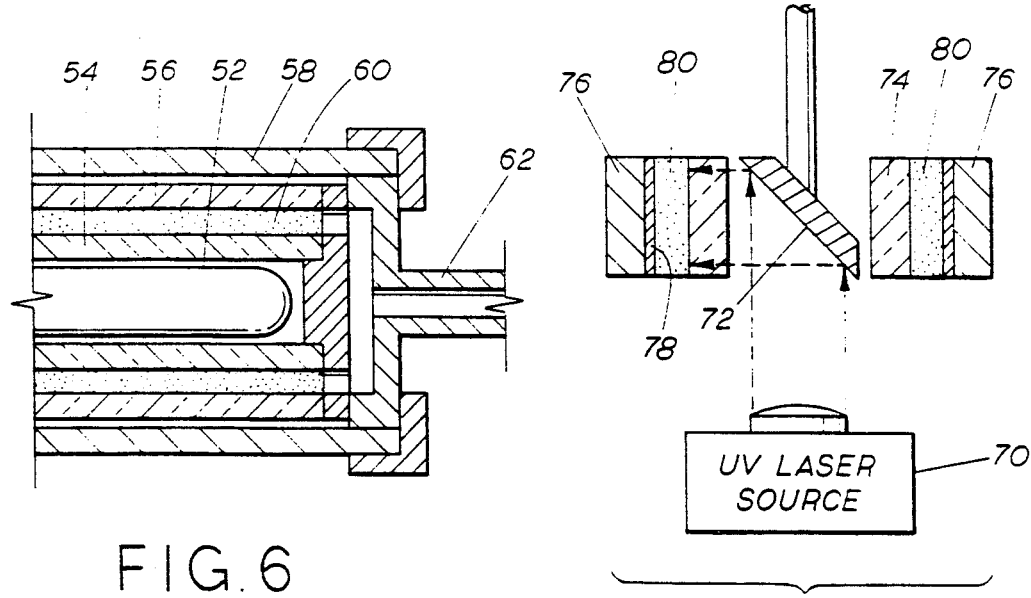

PURIFICATION SYSTEM

ORIGIN OF THE INVENTION

This invention described herein was made in the performance of work under a NASA contract and is subject to the provisions of Section 305 of the National Aeronautics and Space Act of 1958, Public Law 85-568 (72 Stat. 435; 42 U.S.C. 2457).

FIELD OF THE INVENTION

This invention relates to a purification system which uses ultraviolet light irradiation of a granulated activated carbon bed utilized in a water purification system to prolong the useful life span of the carbon bed.

BACKGROUND OF THE INVENTION

Ultraviolet light is a well known means of disinfection and photo-oxidation and this system has been utilized to disinfect or to sterilize water. It is also well known that ultraviolet radiation between 200 and 300 nanometers is most effective in reducing harmful micro-organisms.

Pertinent prior art patents include:

1. U.S. Pat. No. 4,861,484 issued to N.N. Lichtin, et al. on Aug. 29, 1989. This patent describes a process used to produce an effluent suitable for discharge into the terrestrial environment from organic waste. It is a two step batch process in which the device used is a transition metal catalyst and the system requires expendable organic solvents and an oxidizer such as peroxide or ozone. It is noted in the patent that granular activated carbon ("GAC") is a filter material which is useful for the purification of potable water and industrial waste water. Regeneration of the contaminated GAC is by thermal volatilization in which the organic materials previously absorbed into the surface Of the GAC are desorbed by heat and oxidized at high temperature. Limitations of this method include a loss of GAC due to oxidation and attrition, and the cost of energy in heating the GAC to temperatures of about 800°–850° C. The patent also describes off-line chemical regeneration of exhausted GAC in which contaminants of the GAC are desorbed into an organic solvent, which is then treated in a fluidized state with a solid catalyst, an oxidizer, and photoenergy.

In the system, a transitional solid metal catalyst is added and removed as a slurry. The system also requires a gravitational field to facilitate catalyst removal as well as expendable organic solvents and an oxidizer.

2. U.S. Pat. No. 4,798,702 issued to R.E. Tucker on Jan. 17, 1989 discloses a plurality of ultraviolet light sources arranged relative to a fluorinated ethylene propylene tubing which partially transmits ultraviolet light. The tubing is coiled into a helical form around an ultraviolet germicidal source for sterilizing a water solution which flows through the tubing. In this patent it is noted that pipes or tubing made of a fluorinated ethylene propylene copolymer are capable of transmitting ultraviolet radiation over an extended period of time without undergoing photochemical deterioration. Polytetrafluoroethylene also has non-stick properties so that pipes do not cloud with residue. While a smaller pipe favors a better kill, the volume of fluid being sterilized is reduced. A larger pipe increases volumetric flow but reduces the bacterial reduction. In short, the residence time of the fluid media and the intensity of the lamps must be correlated to reach acceptable levels of bacterial kill.

3. U.S. Pat. No. 4,661,264 issued to P.R. Goudy, Jr. on Apr. 28, 1987 utilizes an ultraviolet light laser beam for disinfecting flowing water. The laser beam can be pulsed. The patent notes that water sterilization has been accomplished in the past by flowing water over the surface of a series of ultraviolet bulbs.

4. U.S. Pat. No. 4,219,415 issued to N.A. Nassef on Aug. 26, 1980 discloses a device which employs microwaves as an energy source for treating organic waste products. The patent describes placement of organic waste material on a bed of solid particles of activated carbon. Liquid passes over the bed of solid activated carbon particles and percolates downwardly through the activated carbon particles. Microwave irradiation provides sterilization. When the carbon particles are exhausted they are replaced. This is basically a batch process utilizing a large number of moving parts and expendable components, and which requires a gravitational field to operate properly.

Sterilization or disinfection of water using an ultraviolet light is an established art, as noted heretofore. Filtration of water through filter beds of granulated activated charcoal is also used for purification of water. As used herein granulated activated charcoal may be sometimes referred to as GAC, carbon or charcoal. The treatment of water by filtration through filter beds of granulated activated charcoal to obtain potability tends to remove organic and inorganic contaminants and to some extent micro-organisms from a water solution. However, the granulated activated charcoal filter beds in collecting the contaminants also become a source of contamination in time. This occurs because over a period of time the organic contaminants tend to occlude all of the available carbon surfaces which limits the ability of the filter bed to remove incoming contaminants. The combination of organic substances and the carbon surfaces to which they are absorbed also provides an excellent situation for the poliferation of micro-organisms. Efforts to limit fouling of granulated activated charcoal filter beds with chemicals or thermal means have met with little success. Consequently, fouled granulated activated charcoal filter beds must be periodically removed from a system and replaced with fresh activated carbon. Periodic replacement of charcoal filter beds heretofore has been a customary solution to fouled charcoal filter beds. In any number of instances it is desirable to prolong the life and usefulness of the charcoal filter bed.

SUMMARY OF THE PRESENT INVENTION

The present invention involves a method utilizing ultraviolet radiation to prolong the active life of a granulated activated charcoal filter bed for water treatment. The ultraviolet light irradiating the surfaces of a granulated activated charcoal filter bed destroys micro-organisms, prevents micro-organism poliferation and can eliminate adsorbed organics by ultraviolet enhanced oxidation. In addition to extending the life of a granulated activated charcoal filter bed, the water passing through the filter bed is purified or treated to some limited extent at the same time by the ultraviolet light.

In one form of the present invention, an ultraviolet transparent tetra fluoroethylene ("TEFLON") tubing is packed with six to eight mesh granulated activated charcoal and coiled about an ultraviolet light source. This assembly in turn is surrounded with a reflecting foil or metal surface to allow ultraviolet radiation of the back side of the tubing containing granulated activated charcoal. The ultraviolet light will have a distinct inhibitory effect on micro-organism growth on the surfaces of the carbon, and will disinfect the water passing through the tubing.

In another form of the present invention, a teflon bag can be provided with a tortuous water path and be packed with GAC. The container need not be teflon but can be quartz in a thin wall container configuration where the outer wall has an inner mirror reflection surface. Instead of an ultra violet light source a continuous laser beam can be utilized.

DESCRIPTION OF THE DRAWINGS

FIG. 4 is a perspective view of a form of the invention where a teflon bag is packed with GAC:

FIG. 5 is a view in cross section through a teflon bag arrangement for the present invention;

FIG. 6 is a view in cross section through another form of the present invention; and FIG. 7 is a view in cross section through another form of the present invention.

DESCRIPTION OF THE INVENTION

Figure 1:
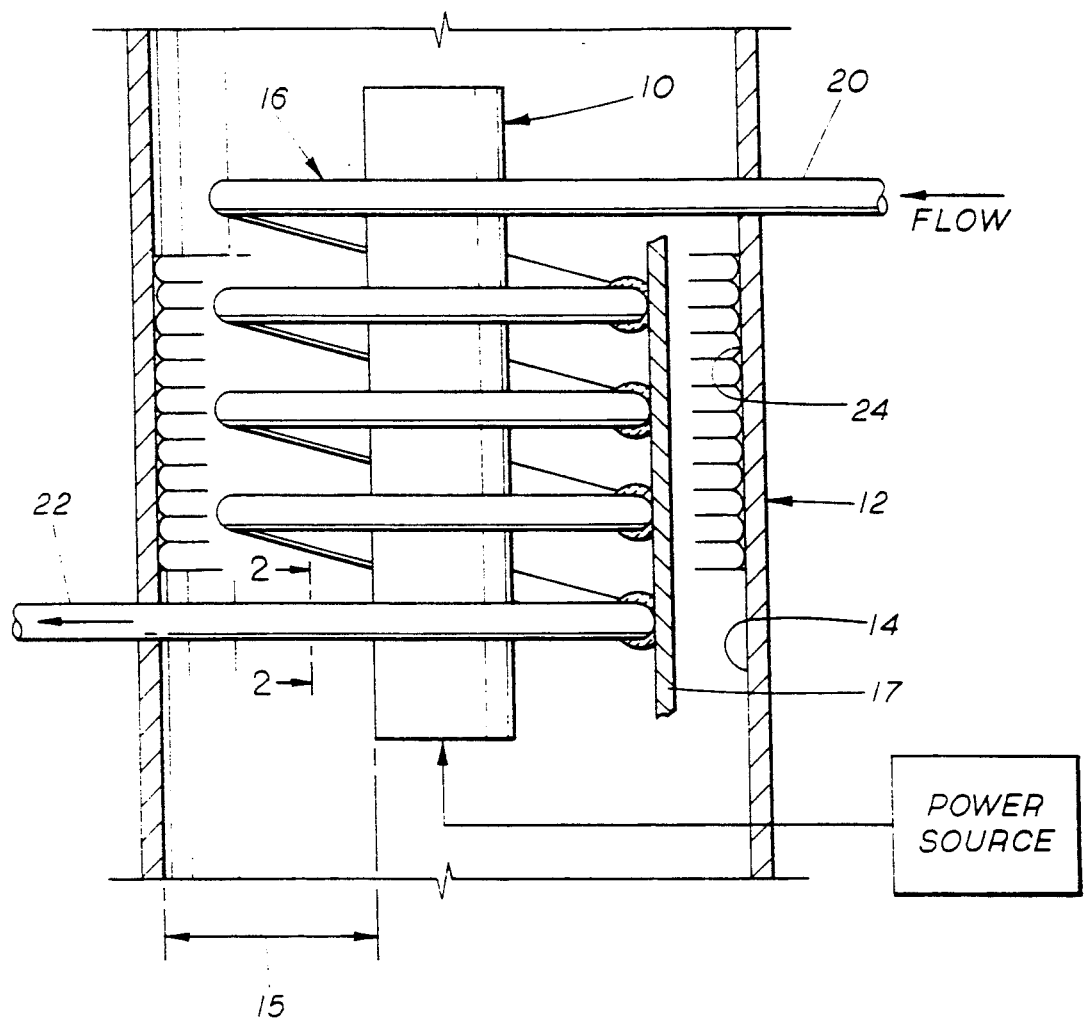
FIG. 1 illustrates a granulated activated carbon bed disposed within tubing coiled about a U/V source.
Figure 2:
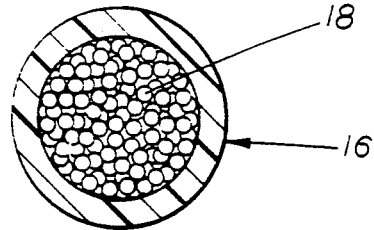
FIG. 2 is a view in cross section taken along line 2—2 of FIG. 1.

Referring now to the drawings, an elongated ultraviolet light source 10 is centrally disposed within a tubular housing 12 having an interior reflecting surface 14 which is cylindrically shaped. The annular space 15 between the light source 10 and the reflective wall surface 14 contains a thin walled spirally wound arcuately coiled tetrafluoroethylene ("TEFLON") tubing 16 held in position by a support 17. The tubing 16 will transmit ultraviolet light. Packed within the tubing 16 is granulated activated charcoal particles 18. (See FIG. 2). Water to be purified is transmitted to an inlet 20 and passed through the tubing 16 and the charcoal particles 18 within the tubing 16 to an outlet 22. The particles 18 extend from the inlet 20 to the outlet 22.

By way of example, a test unit was constructed with aluminum foil as a reflective wall surface disposed about a coil of teflon tubing having a linear length of approximately 1.0 meter, a wall thickness of 0.079 cm; and an outside diameter of 0.635 cm. Granuled activated carbon of 6 to 8 mesh was packed into the length of tubing and a light source of 1.50 cm O.D. was used. The estimated direct flux was $1.5 \times 10^5$ wh/in and the estimated reflected flux was $7.9 \times 10^4$ wh/in. After subjecting a water stream containing a control bacteria to the system for a period of time, it was established that the ultraviolet light had a distinct inhibitory effect on micro-organism survival in the water, and greatly inhibited bacteria growth in the charcoal bed as compared to the inhibiting results for a similar control unit which is not exposed to ultraviolet light. Thus, use of ultraviolet light on a charcoal filter bed prolongs the active life of the charcoal bed as a filter as well as providing some sterilization to the fluid.

Figure 3:
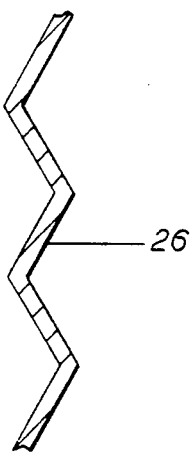
FIG. 3 is partial side view of another form of reflecting wall.

As would be expected, the flow rate of fluid and the length of time that the fluid is exposed to the ultraviolet light radiation has a direct functional relationship to the degree of sterilization of the water. In any event, the purpose of the present invention is to prolong the useful life of the granulated activated charcoal filter by irradiating the charcoal surfaces of the bed. This is independent of the residence time of water in the charcoal bed. It is desirable to design the bed to maximize the flux of ultraviolet light experienced by the charcoal surfaces. As shown in a side view in FIG. 3, a serrated reflection surface can be employed to enhance exposure. Also the charcoal grains should be sized relative to the tubing internal diameter to provide as much surface exposure as possible.

Because of the ability of granulated activated charcoal to attract micro-organisms and organic materials, the ultraviolet radiation increases the rate of kill and decomposition of micro-organisms by collecting the bacteria in the charcoal where it can be killed by the ultraviolet light. This can decrease the radiation required to sterilize the water.

In the form of the invention shown in FIG. 4 a thin layer, flexible FEP (teflon) bag 30 with inner and outer walls 32,34 (FIG. 5) is constructed with closed upper and lower ends 36,38 and closed side surfaces 39,40. Lengthwise extending heat seals 42 alternately extend from the upper and lower ends 36,38 to form a tortuous, continuous flow path between a water inlet 44, and a water outlet 46. Between the inner and outer walls 32,34 is a thin layer of GAC 48. The bag assembly is wrapped around an ultraviolet light source 50 and a layer of reflecting foil material 52 is wrapped around the bag assembly. Use of this assembly permits a throw away feature of the bag assembly.

In FIG. 6 another form of the invention is illustrated when an elongated ultra-violet light source 52 is disposed within an inner tube 54 of light transparent quartz material. About the inner tube 54 is a concentrically arrayed outer tube 56 of light transparent quartz material. About the outer tube 56 is a tubular casing 58 with a mirror inner surface for light reflection. Between the inner and outer tubes 54 and 56 is a layer of GAC 60. Water is input at one end inlet 62 and exits from an outlet (not shown) at the other end. The water flow through the assembly is dispersed about the annulus between the inner and the outer tubes 54,56 and has good contact time with GAC as well as maximum exposure to ultra violet light.

FIG. 7 is a schematic illustration of a system utilizing a laser light source 70 which projects a continuous light beam on a rotating mirror surface 72. The mirror surface 72 is disposed within the bore on inner light transparent tubular member 74. The tubular member 74 is concentrically disposed with an outer tubular member 76 which has an inner mirrored surface 78. GAC 80 is located between the inner and outer members 74,76 and annular flow of water as described with respect to FIG. 6 is treated by the light from the laser source 70.

This invention has obvious applications where charcoal beds in water purification systems are not easily changed or longer life durations of charcoal bed filters are required.

It will be apparent to those skilled in the art that various changes may be made in the invention without departing from the spirit and scope thereof and therefore the invention is not limited by that which is enclosed in the drawings and specifications, but only as indicated in the appended claims.

We claim:

1. In a water purification system used for purifying water, said system including:

flow path means for defining a liquid flow path, said flow path means being constructed from a material capable of transmitting ultraviolet radiation through a wall surface to a liquid in said flow path means, said flow path means having an inlet and outlet and being arcuately coiled therebetween;

a radiation source of ultraviolet radiation of sufficient magnitude to transmit through said wall surface of said flow path means;

ultraviolet controlling means for reflecting ultraviolet radiation to maximize flux to said flow path means;

granulated activated charcoal particles having surfaces disposed substantially along the length of the interior of said flow path means;

said flow path means, said source of ultraviolet radiation and ultraviolet controlling means being disposed in relation to one another for causing said ultraviolet radiation from said radiation source to contact exposed surfaces of aid granulated activated charcoal particles while water is passed through said flow path means, for destroying micro-organisms, oxidizing organic compounds, preventing micro-organism proliferation in the surfaces of said granulated activated charcoal particles and treating the water passing through said flow path means.

2. The system as set forth in claim 1 wherein said flow path means is a flexible thin wall bag assembly which is disposed about a cylindrical light source and which defines a tortuous flow path.

3. The system as set forth in claim 1 wherein said ultraviolet controlling means is a light reflective surface.

4. The system as set forth in claim 1 wherein said radiation source is a continuous laser beam.

5. The system as set forth in claim 1 wherein said flow path means has its liquid flow path disposed relative to said source of ultraviolet radiation for providing a relatively long travel path along the surfaces of said granulated activated charcoal particles and relative to said radiation source.

6. The system as set forth in claim 5 wherein said flow path means is a light transparent tubing and said tubing is disposed between said radiation source and said ultraviolet controlling means.

7. The system as set forth in claim 6 wherein said tubing is spirally wound about said radiation source and said radiation source is elongated along a central axis and said ultraviolet controlling means is a cylindrically formed wall member with a light reflective surface.

8. The system as set forth in claim 7 wherein said wall member has a non-uniform surface configuration for refracting ultraviolet radiation to the interior of said tubing.

* * * * *